United States Patent [19]
Huczko

[11] Patent Number: 5,982,594
[45] Date of Patent: *Nov. 9, 1999

[54] INTRINSICALLY SAFE POWER SOURCE

[75] Inventor: Kevin M. Huczko, New Florence, Pa.

[73] Assignee: KH Controls, Inc., Blairsville, Pa.

[ * ] Notice: This patent is subject to a terminal disclaimer.

[21] Appl. No.: 08/975,818

[22] Filed: Nov. 21, 1997

Related U.S. Application Data

[63] Continuation of application No. 08/652,137, May 23, 1996, Pat. No. 5,694,283, which is a continuation of application No. 08/227,449, Apr. 14, 1994, abandoned.

[51] Int. Cl.⁶ ..................................................... H02H 9/00
[52] U.S. Cl. ............................. 361/54; 361/59; 361/100; 361/115
[58] Field of Search ................................ 361/93, 115, 56, 361/59, 54, 100, 101

[56] References Cited

U.S. PATENT DOCUMENTS 5,029,039  7/1991  Yeh ........................................... 361/93

*Primary Examiner*—Stephen W Jackson
*Attorney, Agent, or Firm*—Ansel M. Schwartz

[57] ABSTRACT

An intrinsically safe power supply unit is provided for conditioning power supplied by a power source. An input power converter connected to the power source receives current from the power source. A direct output crowbar and discrete impedance elements dissipate and limit the energy in the power supply unit that would otherwise be delivered to an external fault. In addition, the direct output crowbar extracts energy from any external storage elements. An adaptive shut down circuit distinguishes nominal load conditions including load changes from an external fault. A multistage LC power filter is used to minimize the stored energy that would be deliverable to an external fault or dissipated by the direct output crowbar and discrete impedance elements. The combination of the direct output crowbar, discrete impedance elements, adaptive shut down detection circuitry and multistage LC power filter significantly improves the level and quality of intrinsically safe power delivered by the power supply unit.

17 Claims, 7 Drawing Sheets

INTRINSICALLY SAFE POWER SOURCE

This is a continuation of application Ser. No. 08/652,137 filed on May 23, 1996 now U.S. Pat. No. 5,694,283, which is a continuation of U.S. patent application Ser. No. 08/227,449 filed Apr. 14, 1994, abandoned.

BACKGROUND OF THE INVENTION

1. Field of the Invention

This invention relates generally to electrical control and supply systems and, more particularly, to intrinsically safe power sources for use in explosive or potentially explosive atmospheric conditions such as those found in the underground coal mining industry.

2. Description of the Prior Art

Numerous national and international standards such as UL913 define requirements for intrinsic safety. These standards require that intrinsic safety be maintained with two component failures and any subsequent failures resulting from the first two component failures. In the underground coal mining industry, tests for intrinsic safety are specifically defined by the Department of Labor, Mine Safety and Health Administration. In order to be intrinsically, safe the power source combined with any additional electrical equipment connected to its output must be incapable of igniting or causing ignition of a mixture of flammable or combustible material in air in the mixture's most easily ignitable concentration.

The basic function of an intrinsically safe power source is to convert power from an available source to conditioned power. The conditioned power is regulated and filtered for specific use by other electrical equipment or devices. An intrinsically safe power source differs from a common power supply by the requirement that the conditioned power be intrinsically safe. The requirement of intrinsic safety imposes characteristics on the device that conflict with traditional performance requirements for a power supply.

FIG. 1 shows an idealized intrinsically safe power source 10. In power source 10, input power 12 is conditioned by power source 14 to produce conditioned power 16. Energy limiting means 18 acts on conditioned power 16 to produce intrinsically safe power 20. In the ideal case, the energy limiting means 18 does not have an adverse effect on the quality of power delivered to the load from power source 14. In reality, however, this is not possible. In particular, the regulation and transient response characteristics of the power source are severely restricted by energy limiting means 18. Accordingly, there is a need for an approach to significantly improve the level and quality of power delivered within the limits of intrinsic safety.

Intrinsic safety has been achieved on previous power supplies by two primary means. Both means are based on limiting the energy flow through the device. The first approach, shown in FIG. 2, is based on providing an adequate impedance or barrier to directly limit the energy delivery. The second approach, shown in FIG. 3, is based on providing a controlled series pass element or valve to stop the delivery of energy. Neither of these techniques addresses the energy stored in the output filter of the device or the energy stored in the load devices and cabling.

The impedance barrier concept is illustrated in FIG. 2. In this example, the barrier device is an energy limiting barrier resistor 22. The impedance barrier concept provides intrinsic safety by limiting the energy flow under all conditions. Unfortunately, the output power quality is a function of the load. As the load current increases, the voltage drop across the barrier resistor 22 increases. Accordingly, the voltage regulation characteristic at the intrinsically safe power terminals is poor. In addition, the total available power to the load is inherently limited by the barrier resistor.

U.S. Pat. No. 5,050,060 illustrates an intrinsically safe power supply unit that attempts to overcome the shortcomings of the barrier resistor approach. In the power supply unit of U.S. Pat. No. 5,050,060, a post regulator is applied after the barrier resistors to improve the power supply performance characteristics.

The controlled series pass element or valve approach is illustrated in FIG. 3. This approach relies on a detection method to determine whether or not the pass element should be turned off. Typically, this decision is based on monitoring the output of the power supply as illustrated by monitors 24. The control element is illustrated as a valve 26. Valve 26 could conceivably be any of several electronic devices including bipolar transistors, field effect transistors, and the like. The series pass element concept can be extended to include an array of more complicated implementations. These more complicated implementations combine the power source and energy limiting valve functions. In such implementations, the power source is turned off based on the output of the monitor circuit. The components providing the energy limiting and monitor functions are typically required to be triply redundant.

U.S. Pat. No. 4,455,509 illustrates a variation of the controlled pass element approach. In the intrinsically safe lighting system of U.S. Pat. No. 4,455,509, the detection of output anomalies is based on output current magnitude that is sensed by a resistive element. The reaction to an overcurrent condition diverts current from the gate firing circuitry for the output power circuit. This action turns off the delivery of power to the output. The intrinsically safe lighting system of U.S. Pat. No. 4,455,509 makes no attempt to remove trapped energy from the output power circuitry.

SUMMARY OF THE INVENTION

An intrinsically safe power supply unit for conditioning power supplied by a power source is shown in which an input power converter connected to the power source receives current from the power source. A direct output crowbar and discrete impedance elements dissipate and limit the energy in the power supply unit that would otherwise be delivered to an external fault. In addition, the direct output crowbar extracts energy from any external storage elements. An adaptive shut down circuit distinguishes nominal load conditions including load changes from an external fault. A multistage LC power filter is used to minimize the stored energy that would be deliverable to an external fault or dissipated by the direct output crowbar and discrete impedance elements. The combination of the direct output crowbar, discrete impedance elements, adaptive shut down detection circuitry and multistage LC power filter significantly improves the level and quality of intrinsically safe power delivered by the power supply unit.

DETAILED DESCRIPTION OF THE PREFERRED EMBODIMENTS

Figure 1:
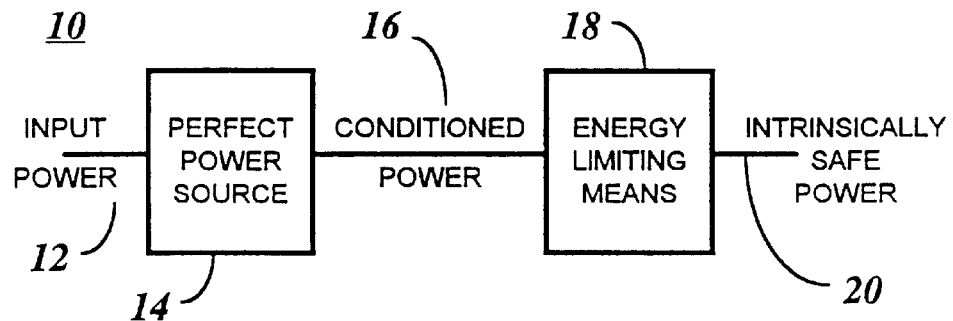
FIG. 1 is a schematic block diagram illustrating a prior art intrinsically safe power supply unit.
Figure 2:
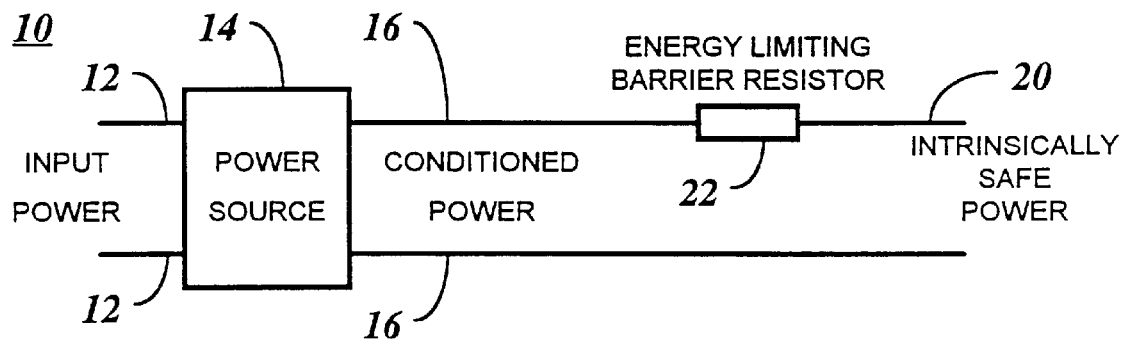
FIG. 2 is a schematic block diagram of a first prior art means for providing intrinsically safe power.
Figure 3:
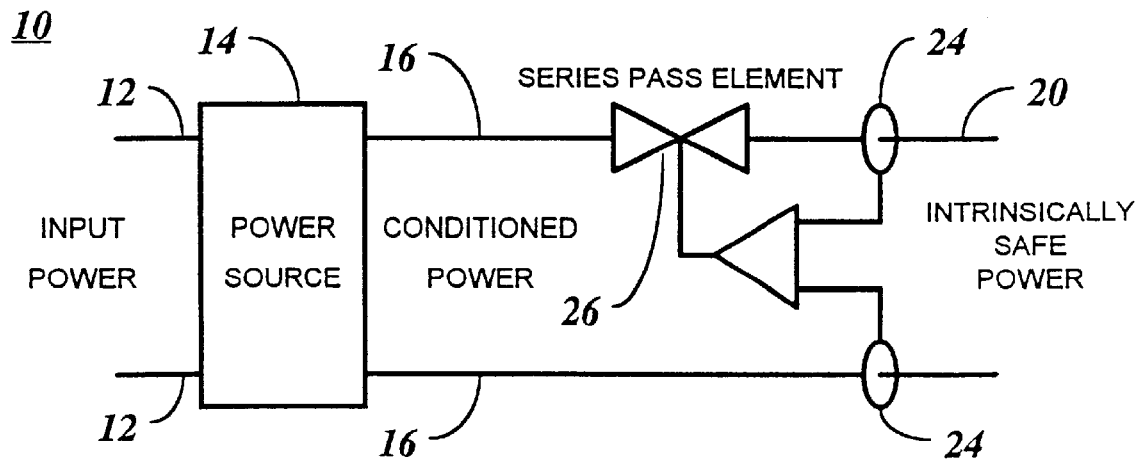
FIG. 3 is a schematic block diagram of a second prior art means for providing intrinsically safe power.
Figure 4:
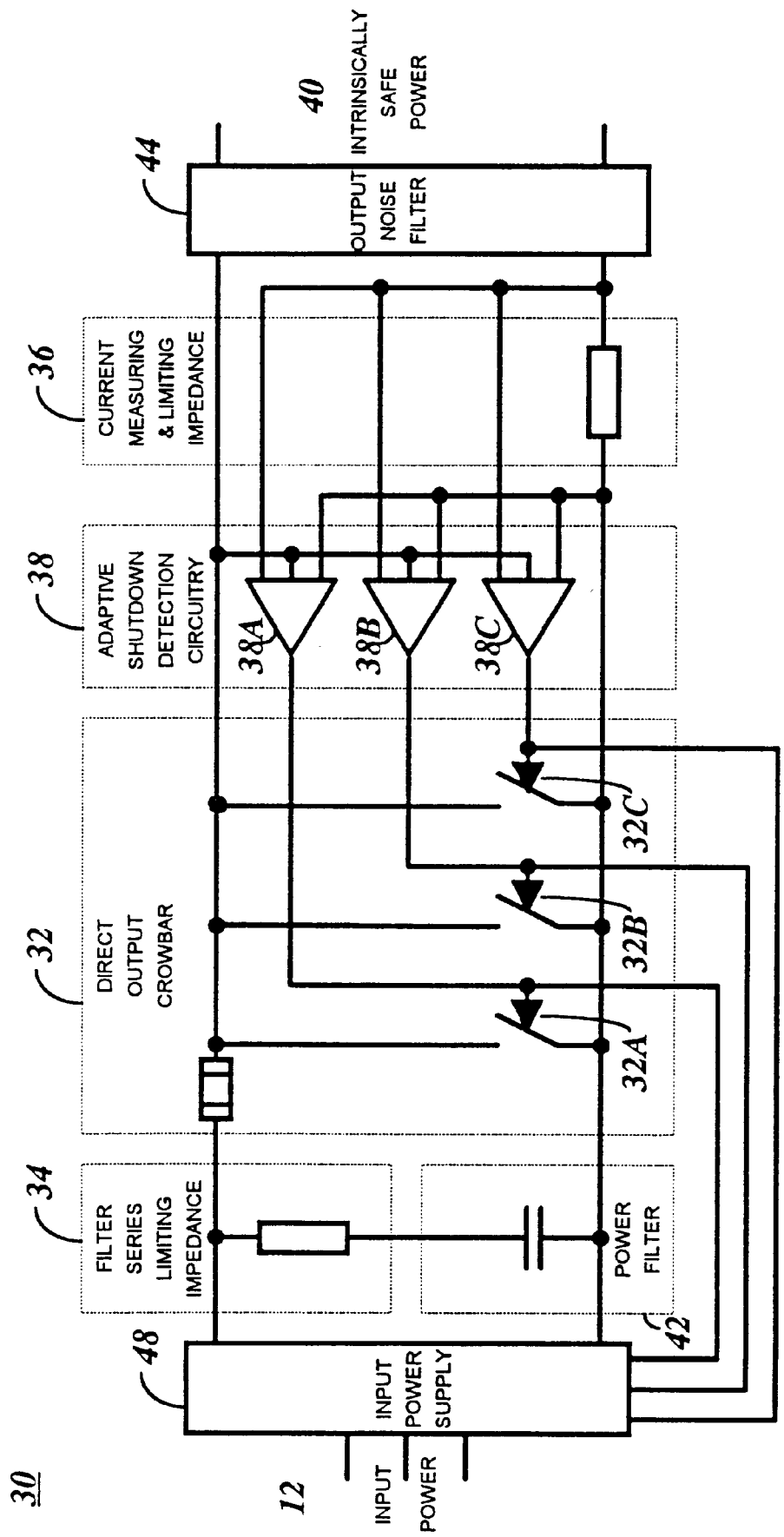
FIG. 4 is a schematic block diagram of the intrinsically safe power supply unit of the present invention.

As illustrated in FIG. 4, an intrinsically safe power supply unit 30 is shown which provides the maximum level of output power while maintaining the required level of fault energy limitation. A direct output crowbar 32, filter series limiting impedance 34, and current measuring and limiting impedance 36 dissipate and limit the energy within power supply unit 30 that would otherwise be delivered to an external fault. In addition, direct output crowbar 32 extracts energy from any external storage elements. An adaptive shut down detection circuitry 38 distinguishes nominal load conditions, including load changes, from an external fault. The direct output crowbar 32 and adaptive shutdown detection circuitry 38 have been implemented with triple redundancy.

Intrinsically safe power supply unit 30 employs a direct output crowbar 32 which is illustrated as a switch n FIG. 4. Direct output crowbar 32 limits the amount of energy that can escape from power supply unit 30 after the mechanism is triggered. This is accomplished by rapidly diverting or shunting any available current away from the output power terminals 40 and into the low impedance path provided by the direct output crowbar 32. This action converts any energy in power filter 42 and output noise filter 44 to heat within power power supply unit 30 in a non-hazardous manner. In addition, this action absorbs energy from any external storage elements, which may be part of the load circuitry. The clamping action of direct output crowbar 32 allows the power filter 42 which is primarily capacitive to be sized much larger than would normally be acceptable for intrinsic safety. The larger power filter 42 provides higher power at high quality levels than was previously possible.

Figure 5:
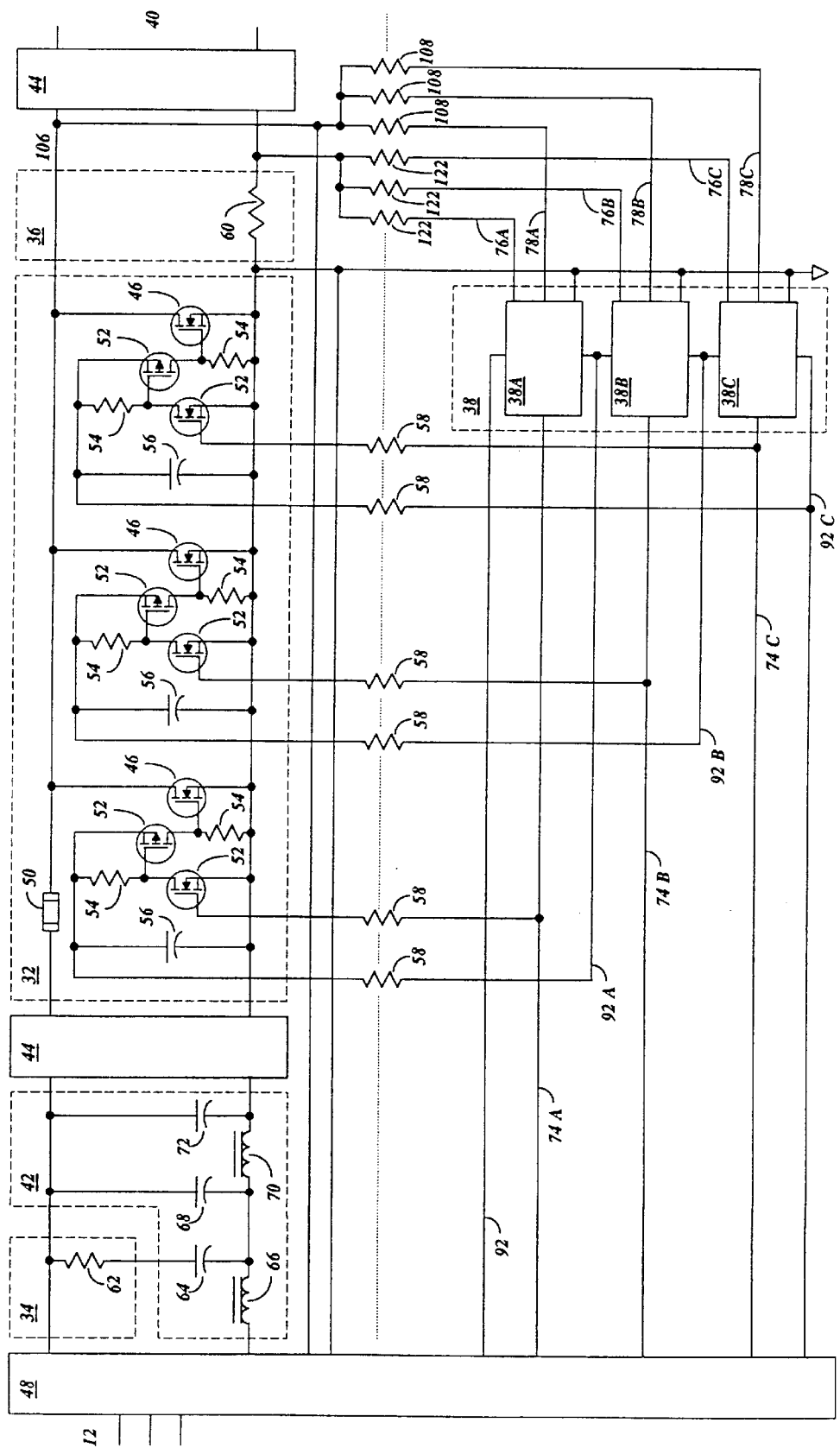
FIG. 5 is a circuit diagram of a presently preferred embodiment of the power filter, the direct output crowbar, the filter series limiting resistor and the current measuring and limiting resistor used in the power supply unit shown in FIG. 4.

The active circuitry within direct output crowbar 32 is implemented with triple redundancy. The circuit is fully functional without the redundancy. As shown in FIG. 5, the switch function is implemented with a solid state device. The solid state device provides high speed operation. A low on-resistance MOSFET 46 with high surge current capability is the presently preferred device. Other semiconductor devices that can be utilized include bipolar transistors, SCRs, IGBTs MCTs or other devices. In the event of a catastrophic failure of the input power supply 48, the energy delivered to the output crowbar is limited by fuse 50.

In the crowbar circuitry shown in FIG. 5, three separate MOSFETs 46 are provided. Each MOSFET 46 is part of a separate channel to provide triple redundant implementation of the direct output crowbar 32 circuitry. The driver circuitry for the direct output crowbar 32 includes a pair of MOSFETs 52, a pair of resistors 54 and a capacitor 56. Resistors 58 couple the driver energy and logic signal for each of the crowbar device channels while providing the energy limiting barrier required to meet intrinsic safety guidelines.

Intrinsically safe power supply unit 30 employs an arrangement of impedance elements which include the filter series limiting impedance 34 and current measuring and limiting impedance 36 in the output circuitry. This network of impedance elements 34 and 36 limit the amount of energy that can escape from the power supply unit 30 in the event of an external fault and insure that this energy is dissipated within the power source. Discrete impedance elements 34 and 36 accomplish this function in such a manner to permit a crowbar mechanism 32 of much lower rating to be applied than would be required without the network. The resistive elements do not require a triply redundant implementation to fulfill the intrinsic safety requirements. This is due to the fact that their primary failure mode does not increase the available external fault energy.

Two resistive elements are designed into the output circuitry of the power source. One of these resistive elements is shown as current measuring shunt resistor 60 in FIG. 5. The other resistive element is a filter series limiting resistor 62 located in series with the main power filter capacitor 64 as shown in FIG. 5.

The current measuring shunt resistor 60 serves the purposes of providing a current feedback signal, limiting output energy on external faults and limiting peak crowbar current. Therefore, it must be optimized to perform all three tasks. The location of current measuring shunt resistor 60 in the circuit is similar to the traditional barrier device. However, current measuring shunt resistor 60 is not an intrinsic safety barrier.

The filter series limiting resistor 62 is placed in series with the main power filter capacitor 64. This circuit location allows the filter series limiting resistor 62 to limit external fault energy, limit peak crowbar current, minimize the negative effects on output regulation and have very low continuous power dissipation. Filter series limiting resistor 62 provides the additional benefit minimizing the effects of changing equivalent series resistance of the filter capacitor 64. Filter series limiting resistor 62 must be optimized to perform these functions and allow for low ripple output power. The main power filter 42 is shown in detail on FIG. 5. Main power filter 42 is a 2 stage LC filter. The first stage consists of inductor 66, main power filter capacitor 64 and capacitor 68. The second stage consists of inductor 70 and capacitor 72.

Figure 6:
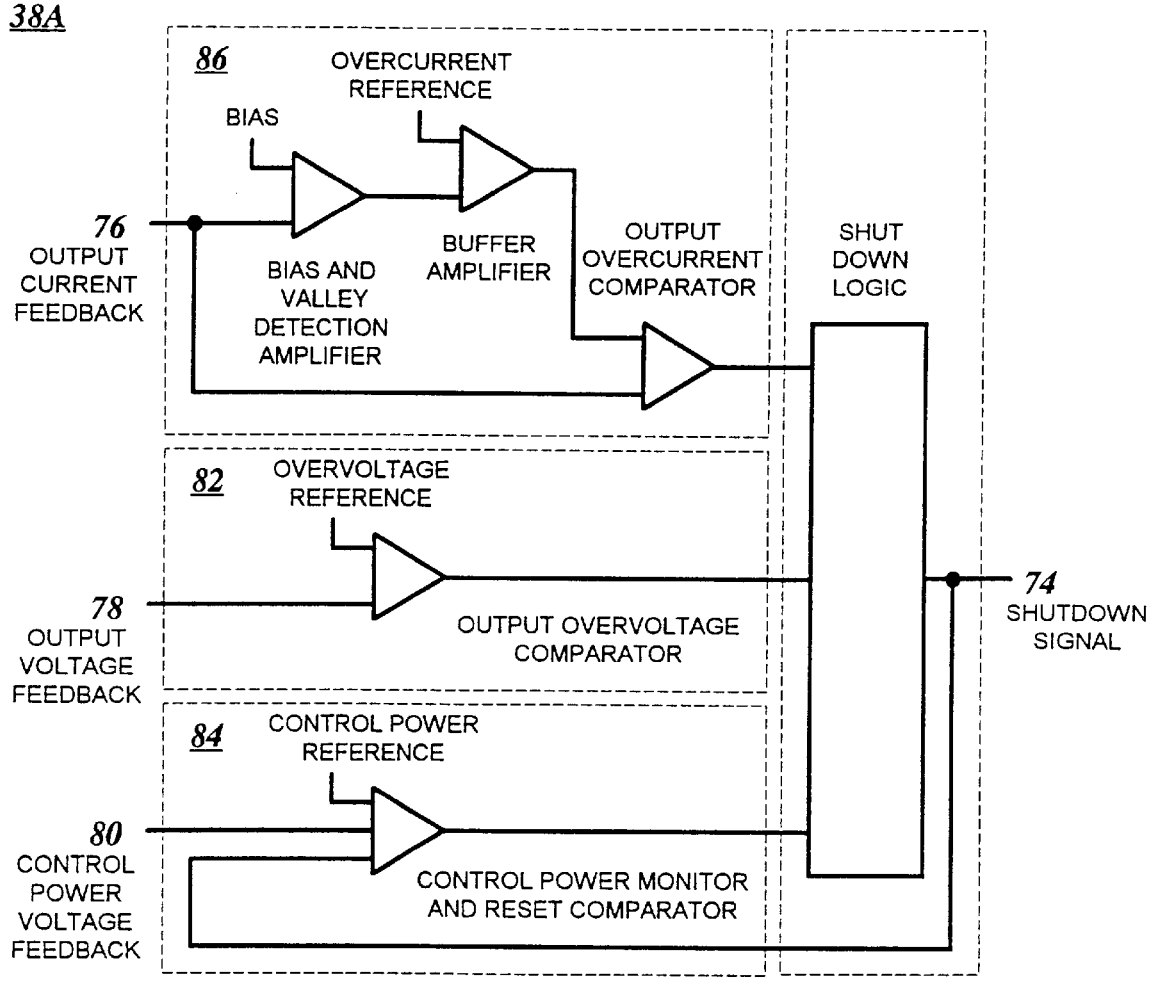
FIG. 6 is a schematic block diagram of the shut down detection circuitry used in the intrinsically safe power supply unit of FIG. 4.

The adaptive shut down detection circuitry 38 of power supply unit 30 is implemented with triple redundancy. The circuitry is fully functional without the redundancy. One of the triply redundant channels 38 is illustrated in FIG. 6. The shutdown signal 74 is a function of output current 76, output voltage 78 and the control power supply voltage 80. The output voltage monitor 82 and control power supply voltage monitor 84 are absolute comparators. The output current monitor 86 employs an adaptive nonlinear spark discriminator circuit in addition to absolute output overcurrent protection. Adaptive current monitor circuitry 86 is far superior to absolute overcurrent protection. This combination of detection circuitry will detect anomalies or variances in power supply output current and voltage that exceed nominal conditions. Adaptive current monitor circuit 86 detects the presence of electrical sparks of a current amplitude significantly below the maximum output current rating of the power source. Adaptive current monitor circuit 86 takes advantage of the spark characteristics for more sensitive detection.

Figure 7:
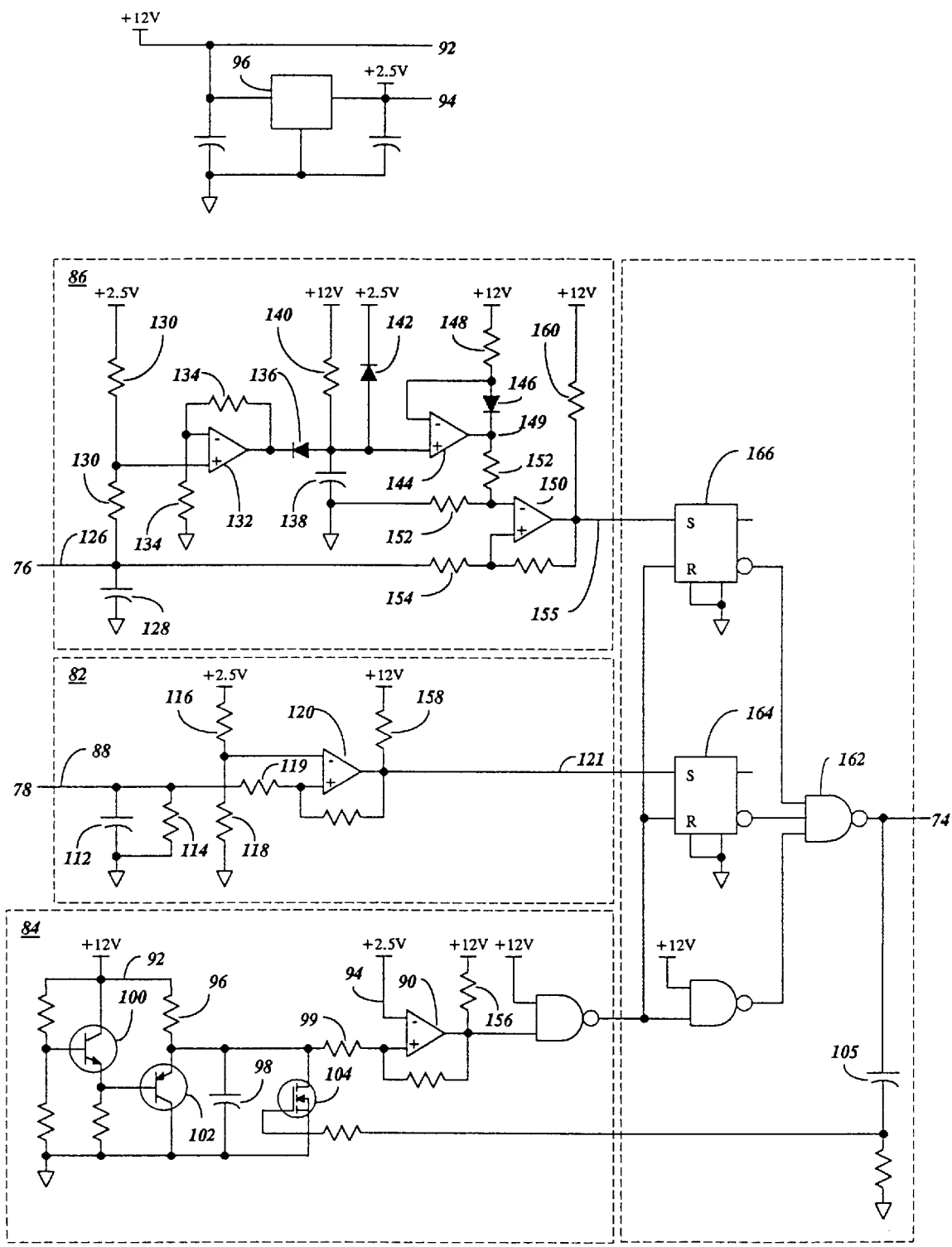
FIG. 7 is a circuit diagram of a presently preferred embodiment of the shut down circuit used in the power supply unit shown in FIG. 4.

The shut down circuit 38A is implemented as shown on FIG. 7. FIG. 7 presents the circuitry for one of the three channels of the triple redundant circuitry. The circuitry shown in FIG. 7 conditions the signals from each of the input nodes 76, 78, 80 to shut down node 74. In addition to providing a trigger signal to the direct output crowbar 32, the shutdown signal 74 turns off the input power supply 48.

The control voltage monitor circuit 84 monitors the logic power supply to insure that the logic circuitry is correctly energized. This comparison is performed by the comparator 90 shown in FIG. 7. Comparator 90 compares the twelve volt DC logic power supply 92 with a 2.5 volt DC reference 94 that is fed directly to comparator 90. The 2.5 volt DC reference 94 is ultimately derived from the twelve volt DC supply 92 by the 3 terminal regulator 96. However, the 2.5 volt DC reference 94 remains regulated through drops in the 12 volt DC rail 92. The 12 volt DC is fed by means of resistor 96 to capacitor 98 that is monitored by comparator 90 by means of input resistor 99. Switch 100 turns off and switch 102 turns on to discharge capacitor 98 very quickly as the twelve volt direct current falls. Resistor 96 insures that capacitor 98 charges slowly to provide a delay at power-up, after an undervoltage condition and after any shut down circuit trip. The shut down circuit trip signal 74 is used to discharge the capacitor 98 by means of switch 104. The shutdown circuit trip signal 74 is coupled to switch 104 by means of capacitor 105.

The output voltage monitor circuit 82 monitors the output voltage of the power supply. The voltage trip threshold is a fixed value to provide output overvoltage protection. output overvoltage may result from either malfunction of the regulator or arcing at the output of the power source. Either condition must result in a safe shutdown of the power source. The output voltage is sensed at the circuit node 106 shown on FIG. 5. The voltage feedback signal 78 is coupled to the shutdown logic circuits 38 by means of three barrier resistors 108 shown on FIG. 5 to meet intrinsic safety requirements. Signal 78 is fed into the input node of each of the triply redundant shutdown logic circuits 38A, 38B and 38C shown on FIG. 5. The output voltage monitor circuit 82 is shown in detail on FIG. 7. Signal 78 enters input node 88 shown on FIG. 7. High frequency noise is removed from the signal 78 by the network consisting of capacitor 112 and resistor 114 shown on FIG. 7. The resulting signal is compared with a fixed value that is set by the resistors 116 and 118. The voltage feedback signal 78 is coupled by means of resistor 119 to comparator 120. The output of comparator 120 is the voltage trip signal 121.

Figure 8:
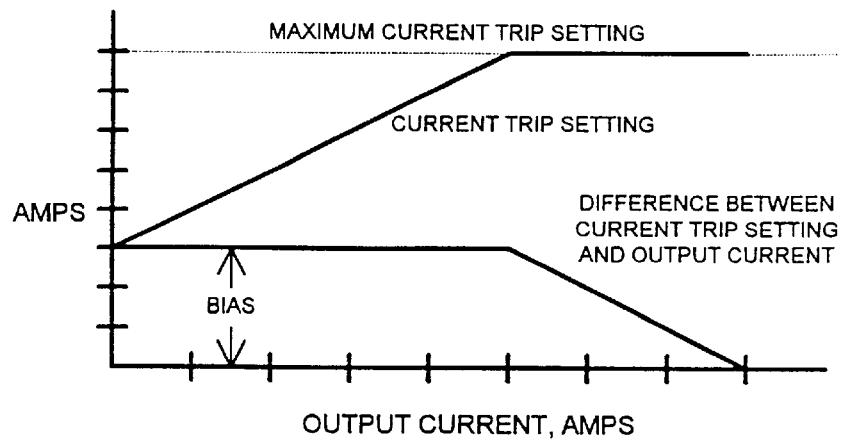
FIG. 8 is a graph showing the current trip setting plotted against output current characteristic of the intrinsically safe power supply unit of FIG. 4.
Figure 9:
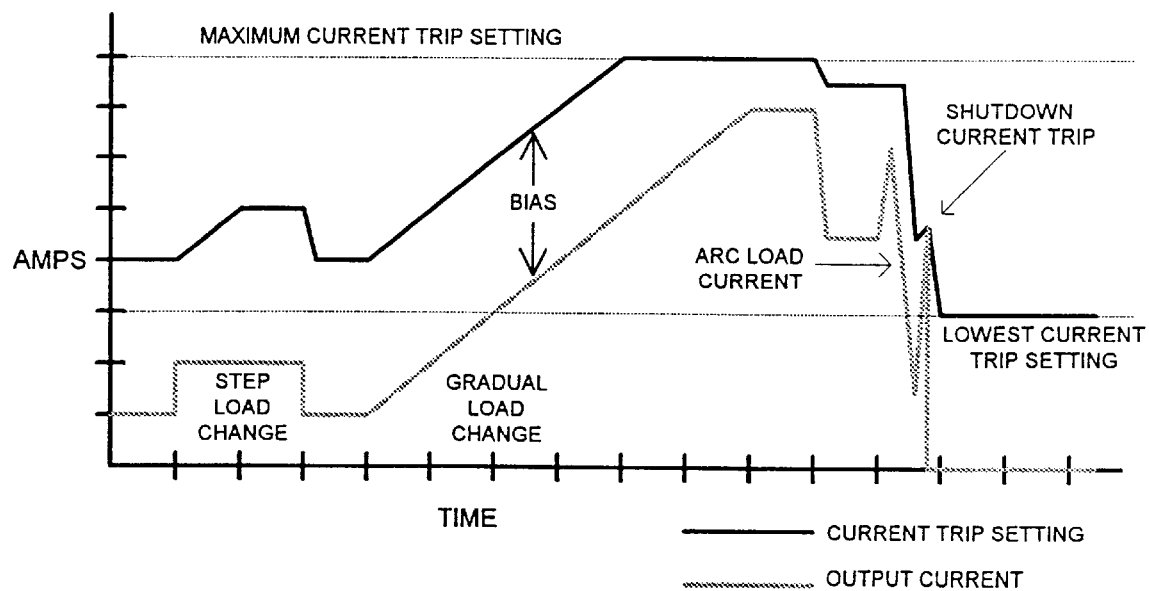
FIG. 9 is a graph showing the current trip setting plotted against time characteristic of the intrinsically safe power supply unit of FIG. 4.

The output current monitor circuit 86 monitors the output current of the power source. Circuit 86 generates a nonlinear adaptive current trip threshold based on the actual output current. All of this circuitry is implemented with triple redundancy. The characteristics of circuit 86 are illustrated in FIGS. 8 and 9. FIG. 8 shows the relationship between the current trip setting and output current, independent of time. The instantaneous current trip threshold is maintained at a predetermined level or bias above the minimum most recent output current. This bias level is reduced to zero as the output current level approaches the maximum limit for intrinsic safety. The general relationship between current trip setting and output current does vary as a function of time. The trip threshold is allowed to integrate upward at a slow rate, milliseconds, to meet increasing load requirements. The threshold drops very quickly to follow reductions in load current or current fluctuations due to arcing at the output load terminals. Therefore, an arc is detected immediately, even at low values of output current. The time characteristics are illustrated in FIG. 9.

FIG. 9 illustrates the adjustments to the current trip setting as the output current varies with time. Step load changes of a magnitude less than the bias trip level will not cause the shut down circuit to trip. This feature greatly reduces the occurrence of nuisance trips. The trip setting adjusts downward at a much higher rate than it adjusts in its upward direction. Gradual load increases or a sequence of nominal step increases in output current causes the current trip setting to integrate upward at a predetermined rate. The maximum limit for the threshold is clamped at a level to maintain intrinsic safety. The violent fluctuations in output current associated with an arc are detected at levels below the maximum current trip setting. This feature relies on a valley detector circuit to establish a value for the recent minimum in output current. The valley detector reacts very quickly to adjust the current trip setting downward with falling output current. The arc current will also attempt to rise very quickly. However, the trip setting will only be permitted to rise at the predetermined rate. The arc is therefore detected. The reaction of the power source will be to extinguish the output current and arc by means of the direct output crowbar circuit.

The output current is sensed by the current measuring shunt resistor 60 shown on FIG. 5. This voltage signal is coupled to the shutdown logic circuit 38 by means of three barrier resistors 122 to meet intrinsic safety requirements. The current feedback signal 76 is fed into the input node 126 of each of the triply redundant output current monitor circuits 86 as shown in FIG. 7. High frequency noise is removed from the signal by capacitor 128. Capacitor 128 must be designed to remove noise without severely limiting the response of the circuit to genuine fault conditions. The resulting signal is added to a bias by means of resistors 130. This bias level determines the difference between the most recent minimum output current and the current trip setting. The bias function is illustrated in FIGS. 8 and 9.

The biased current trip setting is buffered and gain corrected by the operational amplifier 132 and resistors 134. The output of the amplifier 132 is coupled by means of diode 136 to the integrating capacitor 138. Therefore, the amplifier 132 may only discharge the integrating capacitor 138 to reduce the current trip setting to follow reductions in output current. Under falling output current conditions, amplifier 132 can directly discharge capacitor 138. The charging of capacitor 138 or upward integration of the current trip setting is controlled by resistor 140 and its connection to the twelve volt DC supply. The upward integration is clamped or limited by means of diode 142 and its connection to the 2.5 volt DC supply. The resulting voltage on the integrating capacitor 138 is the input signal to the operational amplifier 144 that acts as a buffer. The output voltage of the buffer is adjusted by means of diode 146 to compensate for the error introduced by the voltage drop of diode 142. Resistor 148 provides bias to diode 146. The resulting voltage signal at node 149 is the current trip setting. This setting is applied to comparator 150 by means of resistors 152. The setting is compared with the feedback signal 126 which is applied to comparator 150 by means of resistor 154. The output of comparator 150 is the output current trip signal 155.

Each of the trip level comparators is an open collector output device. Therefore, each has an output pull up resistor. They are output pull up resistor 156 for the control power comparator 90, output pull up resistor 158 for the output overvoltage comparator 120, and output pull up resistor 160 for the output overcurrent comparator 150. The output of the comparators 90, 120, and 150 is a digital trip signal for each function.

All three of the trip signals are combined in an OR function by combiner 162 to generate the digital shut down signal 74. The output overvoltage and overcurrent trip signals are each fed to the SET inputs of digital flip flop circuits 164 and 166, respectively. The digital flip flop circuits 164 and 166 insure that even very narrow trips signals are captured, latched and detected. The control power comparator 90 is inherently latched in the trip state as a result of any shutdown trip for a predetermined period of time. This is accomplished as a result of the discharging of capacitor 98 by switch 104 in response to any shut down event. The latch out time or time to reset is determined by the charge rate of capacitor 98 by means of resistor 96. After the latch out time, the circuit will reset and continue to operate.

The multistage power filter 42, filter series limiting impedance 34, direct output crowbar 32, adaptive shutdown detection circuit 38 and current measuring and limiting impedance 36 each provide individual performance improvements. The combination of multistage power filter 42 filter series limiting Impedance 34, direct output crowbar 32, adaptive shutdown detection circuit 38 and current measuring and limiting impedance 36 facilitates a significant performance improvement for an intrinsically safe power source.

The power supply of the present invention has been designed to operate from an input source of either single or three phase 120-volt alternating current or 160-volt direct current. Other voltages can be easily accommodated with minor changes. The output power rating of approximately 100 watts is based on supplying 12.4 volts direct current at 8.1 amperes with an intrinsic safety acceptance.

Figure 10:
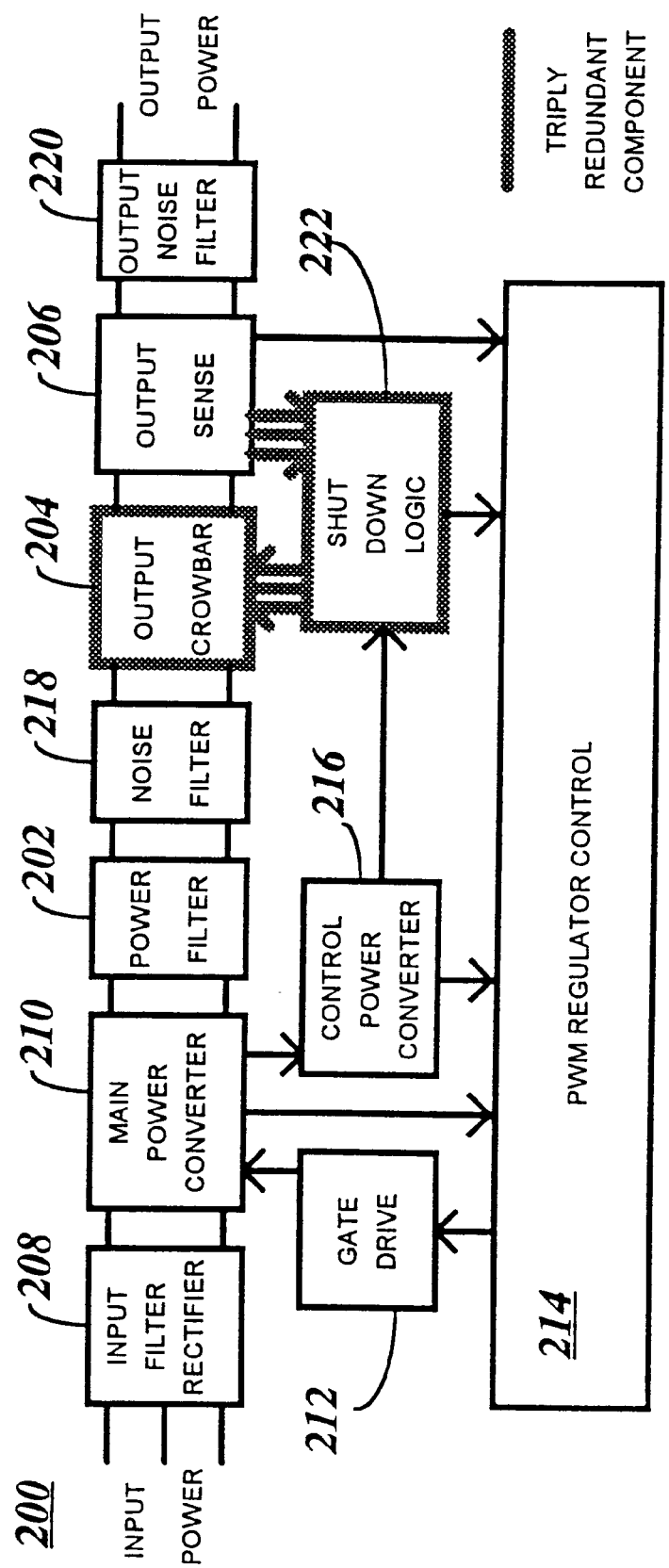
FIG. 10 is a schematic power supply block diagram of the power supply unit shown in FIG. 4.

FIG. 10 illustrates the overall power supply 200 of the present invention. The present invention has been applied to a PWM regulated switch-mode power converter as illustrated in FIG. 10. Other power converter topologies and power supply technologies may be applied.

The power filter circuitry 202, output crowbar circuitry 204 and output sense circuitry 206 are shown in detail on FIG. 5. The power filter circuitry 202 consists of the filter series limiting impedance 34 and power filter components 42. The output crowbar circuitry 204 consists of the direct output crowbar 32 and barrier resistors 58. The output sense circuitry 206 consists of the current measuring and limiting impedance 36 and barrier resistors 108 and 122.

Input filter and rectifier circuitry 208 performs several functions. It provides protection for the intrinsically safe power source from transients and noise on the input power line. It provides filtering to limit the delivery of noise from the intrinsically safe power source into the input power line. It also performs the rectification function to provide direct current power regardless of the input power line configuration.

The main power converter 210, power filter 202, gate drive circuitry 212, PWM regulator circuitry 214 and control power converter 216 combine to provide the basic power supply. Their primary function is to convert the available power to stable, regulated and isolated direct current power.

The noise filter 218 and output noise filter 220 combine to contain the electrical noise generated by the power supply components, primarily the main power converter 210. Therefore, the design of the filters 218 and 220 must vary accordingly with the design of the main power converter 210.

In the foregoing specification certain preferred practices and embodiments of this invention have been set out, however, it will be understood that the invention may be otherwise embodied within the scope of the following claims.

I claim:

1. A discriminator comprising:
a mechanism for receiving a current; and
a mechanism for generating an adaptive non-linear current trip threshold based on the current, said generating mechanism connected to the receiving mechanism.

2. A discriminator as described in claim 1 wherein the generating mechanism maintains the current trip threshold at a predetermined level above the current just received by the receiving mechanism over time.

3. A discriminator as described in claim 2 wherein the generating mechanism reduces the predetermined level to 0 as the current approaches a maximum limit.

4. A discriminator as described in claim 3 wherein the current trip threshold and the current vary as a function of time.

5. A discriminator as described in claim 4 wherein the receiving mechanism includes an input node.

6. A discriminator as described in claim 5 wherein the generating mechanism includes a first operational amplifier, and a bias current trip setting connected to the first operational amplifier which buffers and gain corrects the bias current trip setting.

7. A discriminator as described in claim 6 wherein the generating mechanism includes a comparator which compares the current trip setting to the current and produces the current trip threshold.

8. A discriminator as described in claim 7 including a capacitor connected to the input mode which removes noise.

9. A method for monitoring a current comprising the steps of:
receiving the current; and
generating an adaptive non-linear current trip threshold based on the current.

10. A method for monitoring a current in a mine comprising the steps of:
   placing a discriminator inside the mine;
   receiving current with the discriminator; and
   generating an adaptive current trip threshold based on the current with the discriminator.

11. A method as described in claim 10 wherein the generating step includes the step of generating an adaptive non-linear current trip threshold based on the current with the discriminator.

12. A power source comprising:
   a power supply which produces a current; and
   a discriminator connected to the power supply which receives the current, said discriminator generating an adaptive circuit trip threshold based on the current and turns off the power supply so the power supply cannot produce current when the adaptive circuit trip threshold is tripped.

13. A discriminator comprising:
   a mechanism for receiving a current; and
   a mechanism for generating an adaptive current trip threshold based on the current for detecting electrical sparks, said generating mechanism connected to the receiving mechanism.

14. A discriminator as described in claim 13 wherein the current trip threshold is non-linear.

15. A discriminator as described in claim 14 wherein the generating mechanism maintains the current trip threshold at a predetermined level above the current just received by the receiving mechanism over time.

16. A discriminator as described in claim 15 wherein the generating mechanism reduces the predetermined level to 0 as the current approaches a maximum limit.

17. A discriminator as described in claim 16 wherein the current trip threshold and the current vary as a function of time.

* * * * *